No. 855,263. PATENTED MAY 28, 1907.
J. M. SUDDUTH.
DRAFT ATTACHMENT FOR VEHICLES.
APPLICATION FILED DEC. 26, 1906.

2 SHEETS—SHEET 1.

WITNESSES
Edw. Thorpe

INVENTOR
James M. Sudduth
BY Munn & Co
ATTORNEYS

No. 855,263.
PATENTED MAY 28, 1907.
J. M. SUDDUTH.
DRAFT ATTACHMENT FOR VEHICLES.
APPLICATION FILED DEC. 26, 1906.
2 SHEETS—SHEET 2.
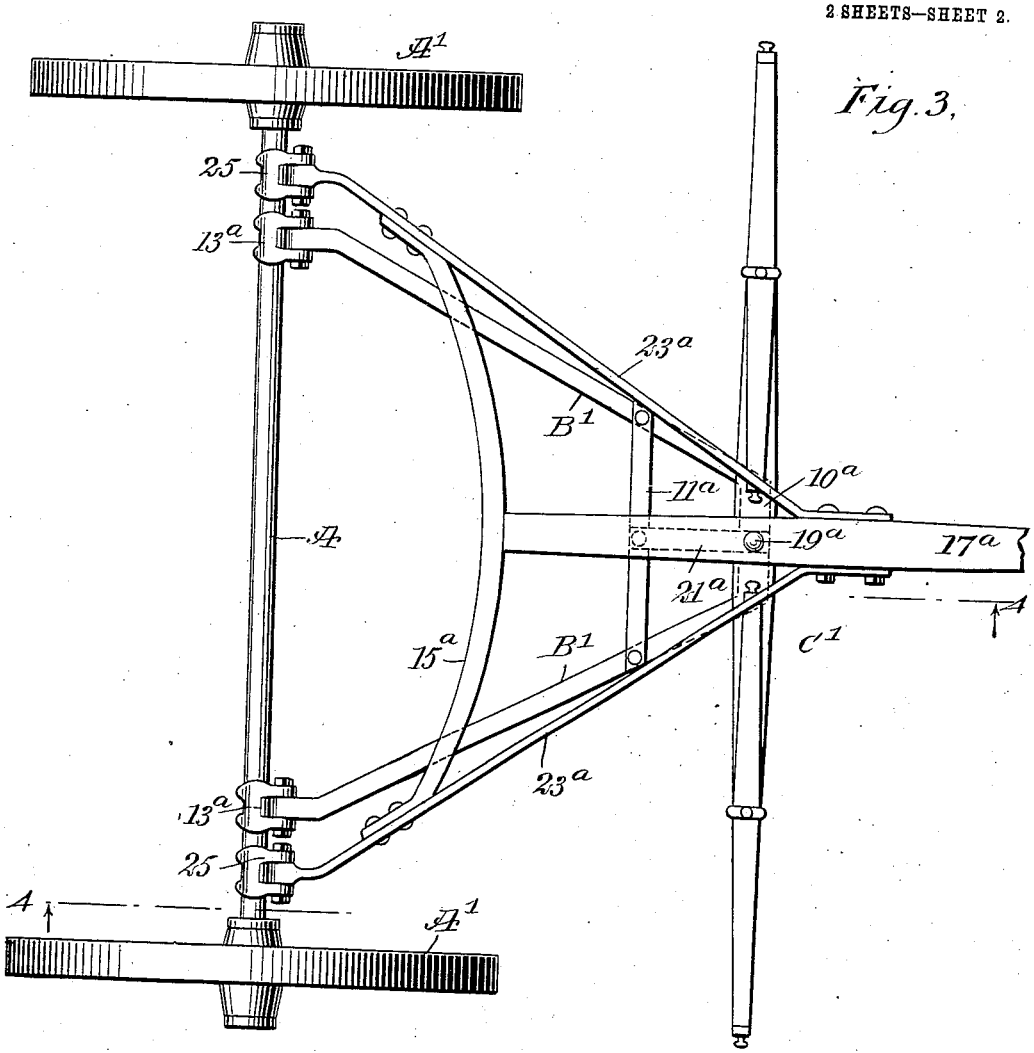
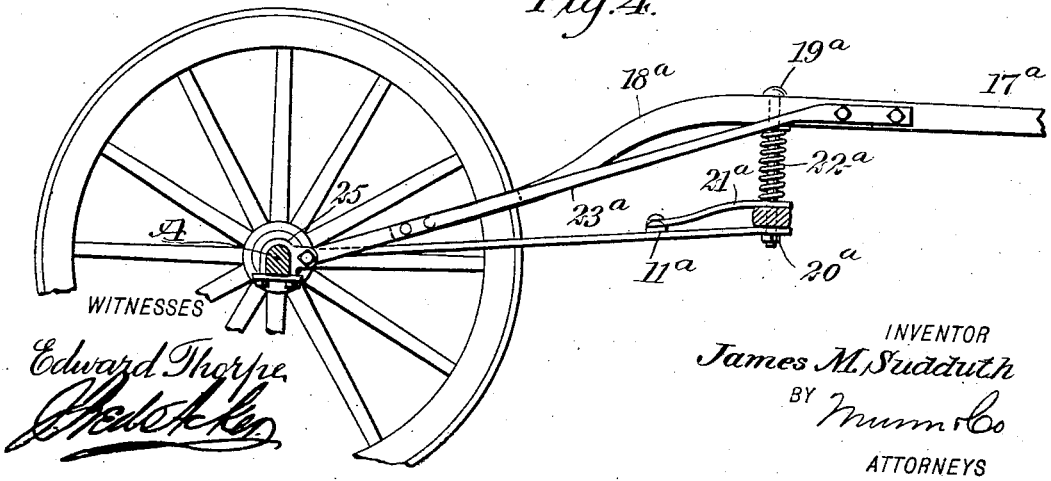
WITNESSES
Edward Thorpe
INVENTOR
James M. Sudduth
BY Munn & Co
ATTORNEYS

UNITED STATES PATENT OFFICE.

JAMES MOFFETT SUDDUTH, OF MANHATTAN, KANSAS.

DRAFT ATTACHMENT FOR VEHICLES.

No. 855,263.  Specification of Letters Patent.  Patented May 28, 1907.

Application filed December 26, 1906. Serial No. 349,483.

*To all whom it may concern:*

Be it known that I, JAMES MOFFETT SUDDUTH, a citizen of the United States, and a resident of Manhattan, in the county of Riley and State of Kansas, have invented a new and Improved Draft Attachment for Vehicles, of which the following is a full, clear, and exact description.

My invention relates to a draft device especially adapted for use where a team of horses is employed, and the purpose of the invention is to provide a simple, durable and economic arrangement that will draw equally from each side of the center of the axle, and which will effectually prevent the tongue or pole from having a whipping action, and which will also render the draft exceedingly easy.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
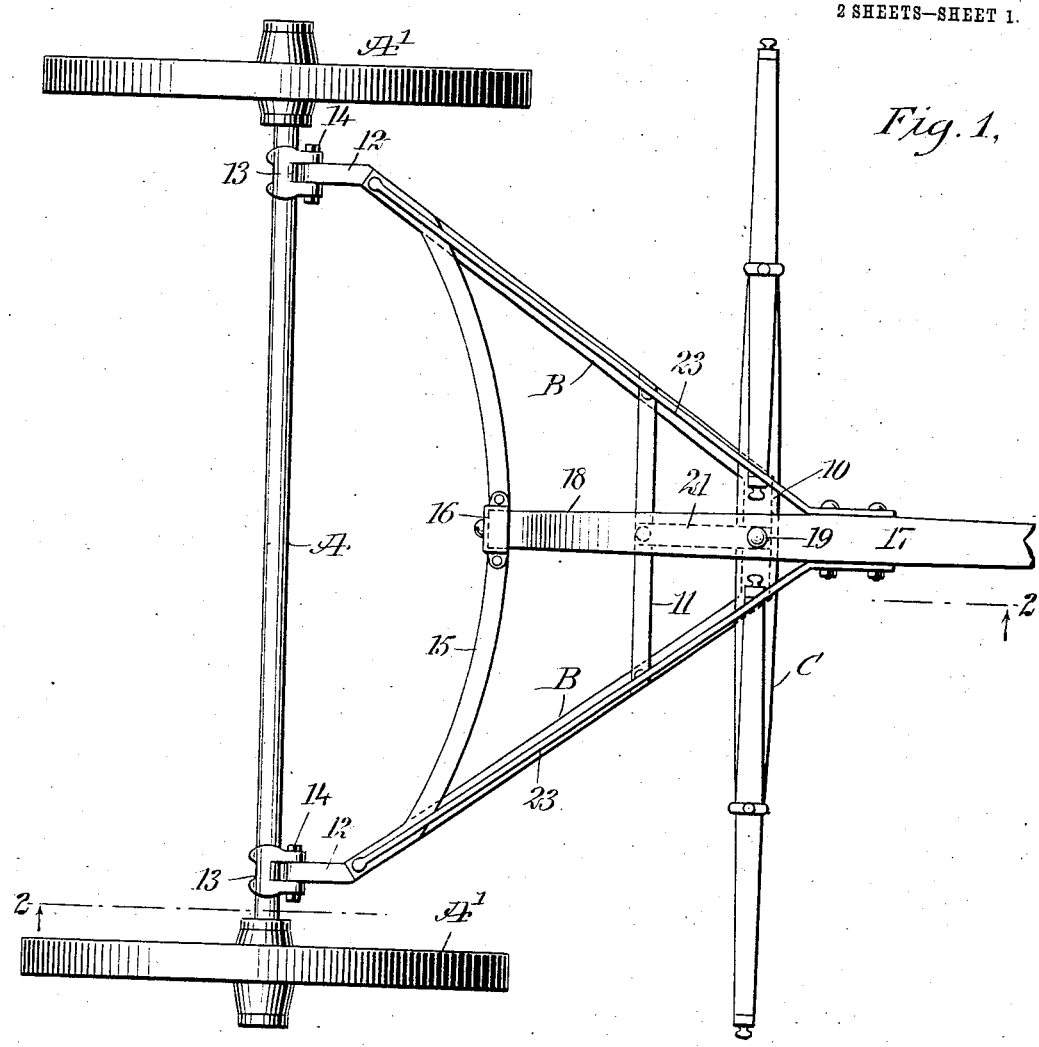
Figure 2:
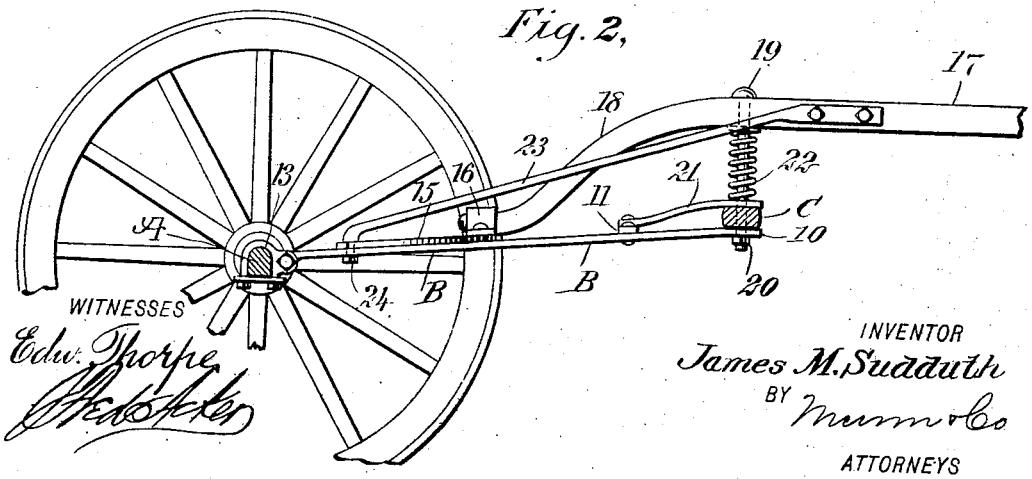

Figure 1 is a plan view of the attachment applied to the forward axle of a vehicle; Fig. 2 is a vertical section taken practically on the line 2—2 of Fig. 1; Fig. 3 is a plan view of a slight modification in the construction of the device, the device being shown applied to the forward axle of a vehicle; and Fig. 4 is a vertical section taken substantially on the line 4—4 of Fig. 3.

A represents the forward axle of a vehicle and A' the supporting wheels for said axle. In the construction of the improved attachment side bars B are employed, which are made to converge at their forward ends at a point opposite the center of the axle A where the said side bars are connected by a horizontal cross bar 10, and a rear cross bar 11 is also employed to connect the said side bars B. The rear ends 12 of the side bars B are straight, and they have anti-rattling pivotal connection with the axle A adjacent to its supporting wheels A', the said anti-rattling connection being of any approved type, as for example clips or clamps 13, are secured to the axle and bolts 14 are passed through said clamps and through the rear ends of the side bars B. The side bars B are also connected by an arched or segmental bar 15, attached to the side bars B adjacent to their inner straight portions 12; and in practice the arched connecting bar 15 may be curved outwardly or in an inward direction as may be desired; but the said arched bar 15 is provided with a socket 16 at its central portion that receives the rear end of the tongue or pole 17, said tongue or pole having a downwardly and rearwardly curved rear portion 18 as is shown in Fig. 2.

A bolt 19 is passed through the tongue or pole 17 and through the central portion of the forward connecting bar or plate 10 for the side bars B, the said bolt being provided with a nut 20 at its lower end. The bolt 19 is likewise passed through the central portion of a doubletree C, and the forward end of a stay strap 21, the rear end of which strap is secured to the intermediate cross bar 11 as is shown in Fig. 2. A spring 22 surrounds the bolt 19, having bearing upon the upper face of the said strap 21 and against the under face of the pole or tongue 17, which spring serves to cushion the said pole or tongue and to hold it up to normal position, thus preventing the tongue or pole from having the customary whipping action, yet permitting it to rise and fall as required by inequalities of the surface over which the vehicle is drawn.

Guy rods 23 are secured at their forward ends to the side portions of the tongue or pole 17 slightly in advance of the bolt 19, and the rear ends of the guy rods 23 are reduced and threaded and are passed down through the end portions of the arched connecting bar 15 and those portions of the side bars B over which the said arched bar extends, suitable nuts being provided for the rear end portions of the said guy rods.

In Figs. 3 and 4 I have illustrated a slight modification in the construction of the attachment, wherein side bars B' corresponding to the side bars B heretofore mentioned, have an anti-rattling pivotal connection with the axle A at a point nearer the center of the said axle than in the construction shown in Fig. 1. These side bars B' also converge at their forward ends and are connected at such point by a horizontal plate 10ª and by a rear plate or bar 11ª, corresponding to the plate or bar 11 in Fig. 1. The ordinary wood circle 15ª is employed, corresponding to the arched bar 15 in Fig. 1, but the said wood circle 15ª is not connected with the side bars B', but is connected with the guy rods 23ª, and these guy rods are secured to the tongue or pole 17ª in the same manner as in Fig. 1, but at their rear ends the guy rods 23ª have an anti-rattling pivotal connection with the axle A at points between the connection of said axle with the side bars B' and the supporting wheels A' as is clearly shown in Fig. 3. The pole or tongue 17ª may be shaped as desired, but is provided in this instance also with a downwardly and rearwardly curved lower end 18ª which is secured to the wood circle 15ª, in the customary manner. A pivot pin 19ª is passed through the tongue or pole 17ª and through a strap 21ª secured to the central portion of the cross bar 11ª and then through the central portion of a doubletree C', corresponding to the doubletree heretofore mentioned; and finally the bolt 19ª is passed through the central portion of the forward connecting plate 10ª for the side bars, being provided at its lower end with a nut 20ª, and as in the construction shown in Figs. 1 and 2 a spring 22ª is coiled around said bolts 19ª, bearing against the stay strap 21ª and the pole or tongue 17ª.

The same results are attained in the construction shown in Figs. 3 and 4 as in the construction shown in Figs. 1 and 2, but the construction shown in Figs. 1 and 2 is simpler and more economic than that shown in Figs. 3 and 4.

Having thus described my invention, I claim as new, and desire to secure by Letters Patent,—

1. In a draft attachment for vehicles, the combination with the axle, of side bars pivotally connected with the axle, a draft device connected with the side bars, a pole or tongue held against lateral movement above the side bars, and a cushion for the pole or tongue located between it and the draft device.

2. In a draft attachment for vehicles, the combination with the forward axle and its supporting wheels, of side bars pivotally connected with the axle, the forward ends of which side bars converge and are connected, an arched bar, a socket carried thereby, means for supporting the arched bar, and a pole or tongue fitted to said socket and extending over and beyond the forward connected portions of the side bars, a draft device located between the forward portions of the side bars and the pole or tongue, a pivot bolt passed through the pole or tongue and through the draft device, and a cushion intervening between the draft device and said pole or tongue, engaging with both of said factors.

3. The combination with the forward axle of a vehicle, its supporting wheels, side bars having hinged connection with the said axle and extending forwardly therefrom, the side bars being made to converge at their forward ends, and a connecting plate for the forward ends of the side bars, an arched bar located in front of the said axle, crossing the side bars, a socket carried by the arched bar, and a pole having its rear end within said socket, of guy rods for the pole, extending rearwardly therefrom, a doubletree located between the pole and the forward connecting plate of the said bars, a bolt passed through the pole, the doubletree and the connecting plate for the side bars, and a spring carried by the bolt, engaging with the doubletree and with the pole or tongue.

4. The combination with the forward axle and supporting wheels of a vehicle, side bars pivotally connected with the said axle, which side bars converge at their forward ends, a connecting plate for the forward ends of the side bars, an arched bar carried by the side bars at a point in front of the axle, a socket secured to the arched bar, and a pole or tongue having its inner end inserted in said socket, of a draft tree located on the connecting plate of the side bars beneath the tongue or pole, a bolt passed through said tongue or pole, the draft tree and the connecting plate of the side bars, a spring coiled around the bolt, bearing against the draft tree and the pole or tongue, guy rods attached to said tongue or pole at its sides, and means for anchoring the rear ends of the said guy rods.

5. In a draft attachment for vehicles, the combination of an axle, side bars, a pivotal connection between the side bars and the axle and a pole or tongue secured at its rear end between the side bars, a draft device supported by the side bars, and a cushion intervening between the under face of the pole or tongue and the draft device.

In testimony whereof I have signed my name to this specification in the presence of two subscribing witnesses:

JAMES MOFFETT SUDDUTH.

Witnesses:
B. W. SMITH,
A. J. WHITFORD.